United States Patent
Krishna et al.

(10) Patent No.: US 9,881,732 B2
(45) Date of Patent: Jan. 30, 2018

(54) DIELECTRIC MATERIALS FOR POWER TRANSFER SYSTEM

(75) Inventors: Kalaga Murali Krishna, Karnataka (IN); Lohit Matani, Varanasi (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1018 days.

(21) Appl. No.: 13/560,259

(22) Filed: Jul. 27, 2012

(65) Prior Publication Data

US 2014/0028105 A1 Jan. 30, 2014

(30) Foreign Application Priority Data

Jul. 28, 2011 (IN) .......................... 2586/CHE/2011

(51) Int. Cl.
*H01F 38/14* (2006.01)
*H01Q 7/00* (2006.01)
(Continued)

(52) U.S. Cl.
CPC ............. *H01F 38/14* (2013.01); *C04B 35/20* (2013.01); *C04B 35/46* (2013.01); *C04B 35/465* (2013.01);
(Continued)

(58) Field of Classification Search
CPC .......... H01Q 7/00; C04B 35/20; C04B 35/46; C04B 35/465; C04B 35/47;
(Continued)

(56) References Cited

U.S. PATENT DOCUMENTS 3,307,064 A * 2/1967 Delphin .............. H01J 23/0876
315/3.5
4,143,207 A * 3/1979 Itakura .................... C04B 35/47
252/520.21

(Continued)

FOREIGN PATENT DOCUMENTS

EP 0708457 A1 4/1996
EP 1113459 A2 7/2001
(Continued)

OTHER PUBLICATIONS

Alexander Tkach, "Effect of Mg Doping on the Structural and Dielectric Properties of Strontium Titanate Ceramics",Jan. 2004; Applied Physics.*

(Continued)

*Primary Examiner* — Rexford Barnie
*Assistant Examiner* — Elim Ortiz
(74) *Attorney, Agent, or Firm* — Peter T. DiMauro; GE Global Patent Operation

(57) ABSTRACT

A contactless power transfer system is proposed. The power transfer system comprises a field-focusing element comprising a dielectric material. The dielectric material includes an oxide material including $(Mg_{1-x}Sr_x)_y TiO_{(2+y)}$, wherein x can vary between the value of zero and 1 such that $0 \le x \le 1$, and y can be 0, 1, or 2. A power transfer system further including a first coil coupled to a power source and a second coil coupled to a load is disclosed. In this system, the field-focusing element including the dielectric material is disposed between the first coil and the second coil.

8 Claims, 4 Drawing Sheets

(51) Int. Cl.
| | |
|---|---|
| C04B 35/20 | (2006.01) |
| C04B 35/46 | (2006.01) |
| C04B 35/465 | (2006.01) |
| C04B 35/47 | (2006.01) |

(52) U.S. Cl.
CPC ............... *C04B 35/47* (2013.01); *H01Q 7/00* (2013.01); *C04B 2235/3206* (2013.01); *C04B 2235/3213* (2013.01); *C04B 2235/3236* (2013.01); *C04B 2235/3239* (2013.01); *C04B 2235/3281* (2013.01); *C04B 2235/3298* (2013.01); *C04B 2235/3445* (2013.01); *C04B 2235/80* (2013.01); *C04B 2235/85* (2013.01)

(58) Field of Classification Search
CPC ........ C04B 2235/85; C04B 2235/3206; C04B 2235/3213; C04B 2235/3236; C04B 2235/3239; C04B 2235/3281; C04B 2235/3298; C04B 2235/3445; C04B 2235/80; H01F 38/14
USPC ........................................................ 307/104
See application file for complete search history.

(56) References Cited

U.S. PATENT DOCUMENTS

| | | | | |
|---|---|---|---|---|
| 4,307,403 | A * | 12/1981 | Yamada | H01Q 15/22 343/755 |
| 5,750,264 | A * | 5/1998 | Ueno | C04B 35/47 428/426 |
| 5,866,196 | A * | 2/1999 | Ueno | C04B 35/47 29/25.41 |
| 6,090,435 | A * | 7/2000 | Ueno | C04B 35/47 29/610.1 |
| 6,204,597 | B1 * | 3/2001 | Xie | H01J 3/022 313/309 |
| 6,436,332 | B1 | 8/2002 | Fasano et al. | |
| 6,641,940 | B1 | 11/2003 | Li et al. | |
| 6,905,989 | B2 | 6/2005 | Ellis et al. | |
| 8,013,316 | B2 * | 9/2011 | Eleftheriades | B23K 26/38 219/121.71 |
| 8,244,083 | B2 * | 8/2012 | Seidman | A61B 18/1815 385/31 |
| 8,736,128 | B2 * | 5/2014 | Dede | H02K 29/03 310/191 |
| 8,766,092 | B2 * | 7/2014 | Peng | G02B 5/1809 136/259 |
| 8,797,702 | B2 * | 8/2014 | Banerjee | G02B 1/002 361/143 |
| 9,013,068 | B2 * | 4/2015 | Ryu | H02J 17/00 307/104 |
| 2009/0075119 | A1 | 3/2009 | Zhang et al. | |
| 2009/0153275 | A1 | 6/2009 | Lee et al. | |
| 2009/0303154 | A1 * | 12/2009 | Grbic | B82Y 20/00 343/909 |
| 2010/0065352 | A1 * | 3/2010 | Ichikawa | B60L 11/182 180/65.8 |
| 2010/0328044 | A1 * | 12/2010 | Waffenschmidt | H02J 7/025 340/10.4 |
| 2011/0133569 | A1 * | 6/2011 | Cheon | H02J 17/00 307/104 |
| 2011/0163827 | A1 * | 7/2011 | Kanno | H01G 4/255 333/185 |
| 2011/0248890 | A1 * | 10/2011 | Lee | H01Q 1/2283 343/700 MS |
| 2012/0015198 | A1 * | 1/2012 | Masukawa | B32B 18/00 428/446 |
| 2012/0032521 | A1 * | 2/2012 | Inoue | B60L 11/123 307/104 |
| 2012/0235634 | A1 * | 9/2012 | Hall | H03H 7/40 320/108 |

FOREIGN PATENT DOCUMENTS

| | | |
|---|---|---|
| WO | 2010095281 A1 | 8/2010 |
| WO | 2010110201 A1 | 9/2010 |

OTHER PUBLICATIONS

Chao et al., Effects of sintering temperature on the microstructure and dielectric properties of titanium dioxide ceramics, Journal of Materials Science, Dec. 2010, v 45, n 24, p. 6685-6693,; DOI: 10.1007/s10853-010-4761-4; Publisher: Springer.

Liu et al., Preparation and dielectric properties of BST-Mg2TiO4 composite ceramics, Materials Chemistry and Physics, Apr. 15, 2009, v 114, n 2-3, p. 624-628,; DOI: 10.1016/j.matchemphys.2008. 10.008; Publisher: Elsevier Ltd.

Kang et al., "Structure and Design of Modern Microwave Filters", Science Press, Issue No. 1, vol. 2, pp. 443-445, Nov. 1974.

Unofficial English Translation of Chinese Office Action and Search Report issued in connection with corresponding CN Application No. 201210384398.4 on Sep. 29, 2015.

Unofficial translation of Chinese Search Report issued in connection with corresponding CN Application No. 201210384398.4 dated Apr. 27, 2015.

Unofficial translation of Tang, Hao et al., "Develop of SrTiO3 Systems ceramics with negative line-type TC Curve", Electronic Components and Materials vol. 26, No. 6., Jun. 30, 2007, pp. 61-63.

Unofficial translation of Wei, Cheng et al. "Influence of process on SrTiO3—MgTiO3—Bi2O3• nTiO2 ceramic structure and performance", Journal of Xi'an Jiaotong University vol. 31, No. 10, Oct. 31, 1997, pp. 1-5.

Unofficial translation of Kaiyuan, HE, "Introduction to Functional Materials", Metallurgical Industry Press, Aug. 31, 2000, pp. 156-159.

EP Search Report and Written Opinion from corresponding EP Application No. 12178130.6 dated Jan. 4, 2013.

Tkach, A. et al., "Effect of Mg doping on the structural and dielectric properties of strontium titanate ceramics", Applied Physics, vol. 79, No. 8, Oct. 1, 2003.

Pfaff, et al., "Peroxide route for synthesis of magnesium titanate powders of various compositions", Ceramics International, Elsevier, Amsterdam, NL, vol. 20, No. 2, Jan. 1, 1994, pp. 111-116.

\* cited by examiner

DIELECTRIC MATERIALS FOR POWER TRANSFER SYSTEM

BACKGROUND

This application claims priority under 35 USC 119 from India Patent Application Number 2586/CHE/2011, filed 28 Jul. 2011. The invention relates generally to power transfer systems, and, in particular, to resonance based contactless power transfer systems.

In certain applications where instantaneous or continuous energy transfer is needed but interconnecting wires are inconvenient, contactless power transfer is desirable. One contactless power transfer method is an electromagnetic induction method that works on the principle of a primary transformer coil generating a dominant magnetic field and a secondary transformer coil in the vicinity of the primary transformer coil generating a corresponding voltage. The magnetic field received by the secondary transformer coil decreases as a function of the square of the distance between the two coils, and hence the coupling between primary and secondary coils is weak for distances greater than a few millimeters.

Another method of contactless power transfer attempts to increase the efficiency of the inductive power transfer by resonant inductive coupling. Transmitter and receiver elements resonate at the same frequency, and maximum induction occurs at the resonant frequency. However, such resonant induction is sensitive to load and gap variations.

There is a need for an efficient contactless power transfer system that may operate with coils separated by longer distances than are presently acceptable and is efficient when subjected to misalignment or load variations. Further, there is a need for accommodating and efficient materials, having high dielectric properties and low dielectric loss factors that can be used in the power transfer systems in the required frequency ranges.

BRIEF DESCRIPTION

Briefly, in one embodiment, a power transfer system is provided. The power transfer system comprises a field-focusing element including a dielectric material. The dielectric material includes an oxide material including $(Mg_{1-x}Sr_x)_y TiO_{(2+y)}$, wherein x can vary between the value of zero and 1 such that $0 \leq x \leq 1$, and y can be 0, 1, or 2.

In one embodiment, a power transfer system is provided. The power transfer system comprises a first coil coupled to a power source and a second coil coupled to a load; and a field-focusing element including a dielectric material and disposed between the first coil and the second coil. The dielectric material includes an oxide material including $(Mg_{1-x}Sr_x)_y TiO_{(2+y)}$, wherein x can vary between the value of zero and 1 such that and y can be 0, 1, or 2.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention include power transfer systems and the dielectric materials that can be used for power transfer systems.

In the following specification and the claims that follow, the singular forms "a", "an" and "the" include plural referents unless the context clearly dictates otherwise.

Contactless power transfer systems are typically characterized by short distance power transfer between primary and secondary coils. For example, one embodiment of an inductive power transfer system uses a primary coil and a secondary coil to transfer power between two circuits in galvanic isolation. A magnetic field is established around the primary coil when coupled to a power source. The quantity of power transferred from the primary coil to the secondary coil is proportional to the level of primary magnetic field linking the secondary coil. Electrical transformers use high permeability magnetic cores to link the magnetic field between primary and secondary coils and thus achieve efficiencies on the order of at least about 98%. However, when such systems are configured for contactless power transfer, the air gap between the two coils reduces the magnetic field coupling. Such reduced coupling affects efficiency of contactless power transfer systems.

Certain embodiments disclosed herein provide a robust contactless power transfer system with reduced sensitivity to load variations, efficient power transfer during misalignment of coils, and a field-focusing structure that enhances power transfer efficiency.

Figure 1:
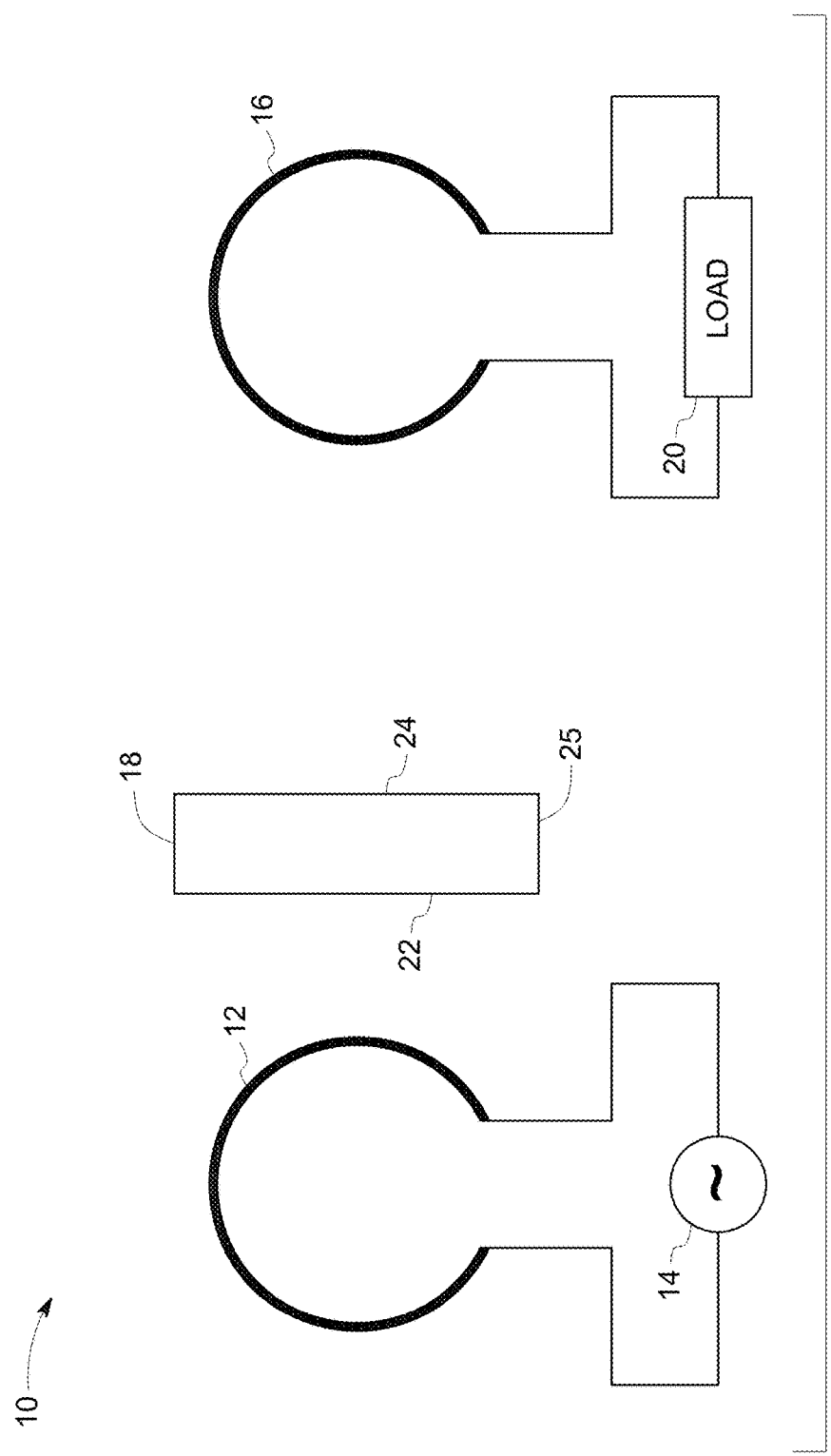
FIG. 1 illustrates an exemplary contactless power transfer system according to an embodiment of the invention.
Figure 4:
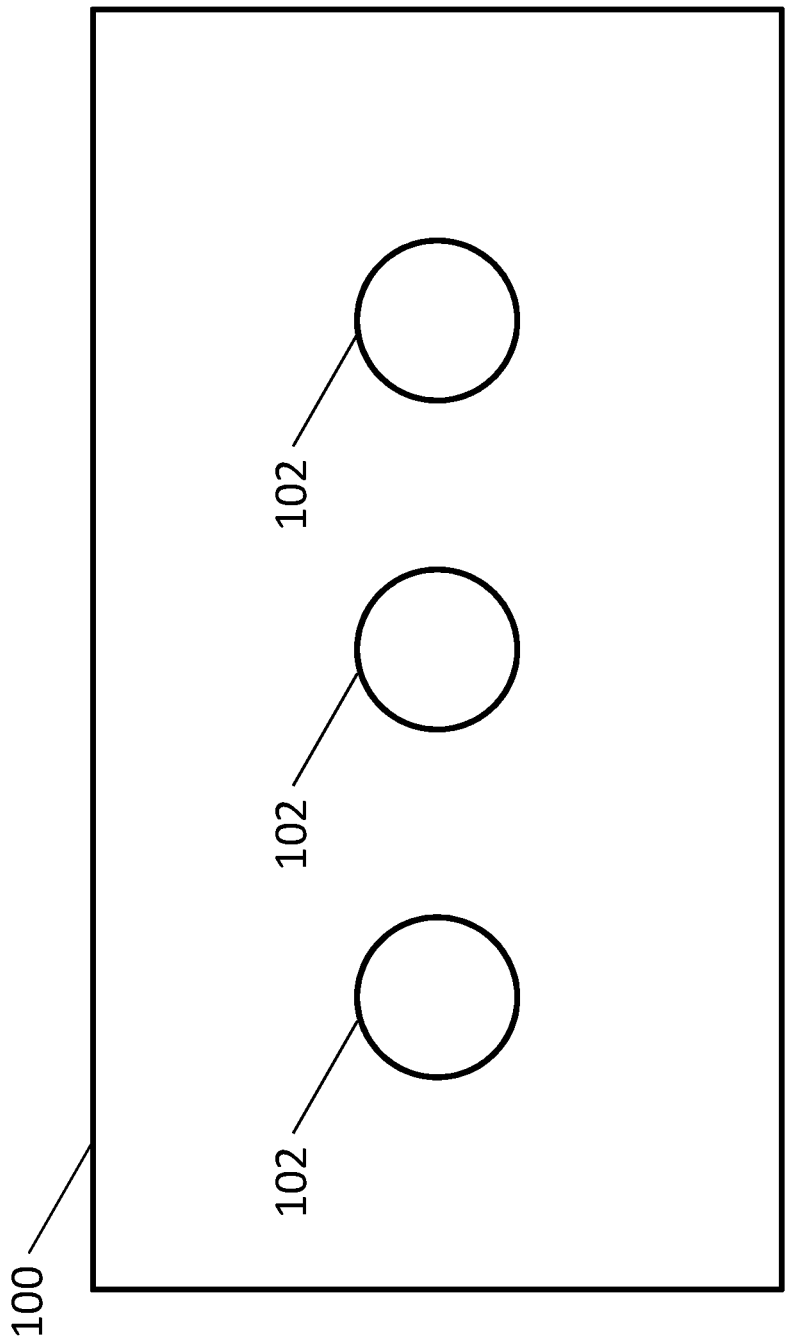
FIG. 4 illustrates an exemplary field-focusing element including a plurality of resonators.

FIG. 1 illustrates an example of a contactless power transfer system 10 according to an embodiment of the invention including a first coil 12 coupled to a power source 14 and configured to produce a magnetic field (not shown). A second coil 16 is configured to receive power from the first coil 12. As used herein, the term "first coil" may also be referred to as a "primary coil," and the term "second coil" may also be referred to as a "secondary coil." The primary and secondary coils can be made up of any good electrical conducting materials such as, for example, copper. Field-focusing element 18 is disposed between the first coil 12 and the second coil 16 for focusing the magnetic field from power source 14. In another embodiment, the field-focusing element may be used to focus electric fields and/or electromagnetic fields. The terms "magnetic field-focusing element" and "field-focusing element" are used interchangeably. In one embodiment, magnetic field-focusing element 18 is configured as a self-resonant coil and has a standing wave current distribution when excited via the first coil. In another embodiment, the magnetic field-focusing element includes multiple resonators operating as an active array or a passive array and each resonator configured as a self-resonant coil with a standing wave current distribution. In yet another embodiment, the magnetic field-focusing element includes multiple sets of such resonators, each such resonator set excited at a particular phase. For example, FIG. 4 illustrates a field-focusing element 100 (such as field focusing element 18 shown in FIG. 1) including multiple resonators 102. It may be appreciated that, when exciting the sets of resonators via different phases, field-focusing may be enhanced in a desired direction.

Magnetic field-focusing element 18 is further configured to focus the magnetic field onto the second coil 16 enhancing the coupling between the first coil 12 and the second coil 16. In one embodiment, a non-uniform magnetic field distribution is developed around magnetic field-focusing element 18 by creating a standing wave current distribution in the field-focusing element 18. In the illustrated embodiment, field-focusing element 18 is placed closer to the first coil 12 as an example. It may be advantageous in certain systems to place the field-focusing element 18 closer to the second coil 16. A load 20 is coupled to the second coil 16 to utilize the power transferred from the power source 14. In certain embodiments, the contactless power transfer system 10 may also be configured to simultaneously transfer power from the second coil to the first coil such that the system is capable of bidirectional power transfer. Non-limiting examples of potential loads include a bulb, a battery, a computer, a sensor, or any device that requires electrical power for operation.

The contactless power transfer system 10 may be used to transfer power from the power source 14 to the load 20. In one embodiment, the power source 14 comprises a single-phase AC power generator or three-phase AC power generator in combination with power conversion electronics to convert the AC power to a higher frequency. When the first coil 12 is excited at the resonant frequency of magnetic field-focusing element 18, a standing wave current distribution is developed within the magnetic field-focusing element 18 between two open ends (22, 24) of the field-focusing element. The standing wave current distribution leads to a non-uniform magnetic field distribution around magnetic field-focusing element 18. Such non-uniform current distribution is configured to focus magnetic field in any desired direction, such as, in a direction of the second coil 16 in this example. When operating at resonant frequency, even a small excitation to magnetic field-focusing element 18 produces large amplitude of current distribution along the length 25 of the magnetic field-focusing element. This large current magnitude of non-uniform distribution leads to an amplified and focused magnetic field in the direction of second coil 16 that results in higher efficiency of power transfer.

Figure 2:
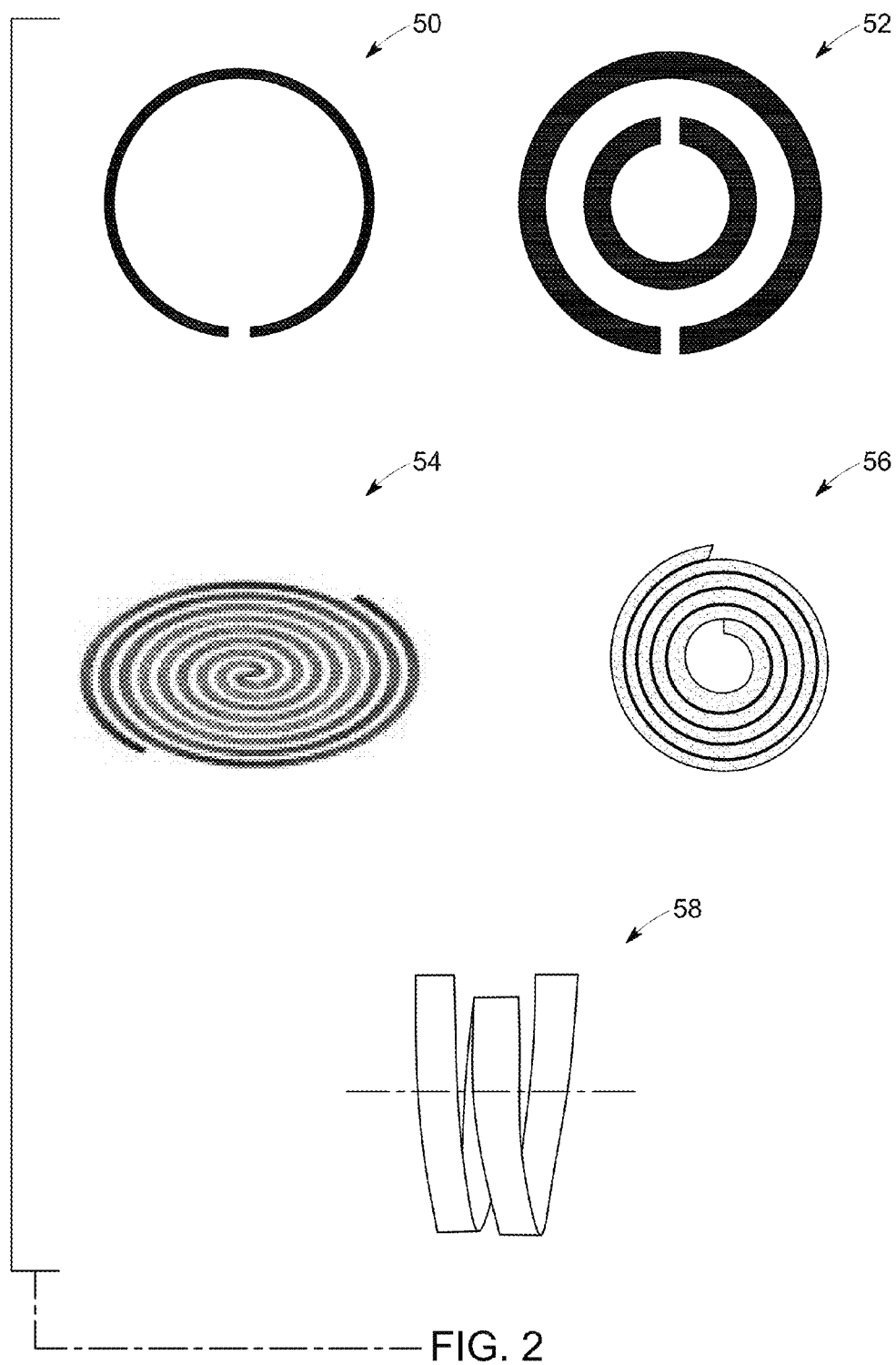
FIG. 2 illustrates multiple exemplary structures of field-focusing elements according to various embodiments of the invention.

FIG. 2 illustrates multiple examples of structures for field-focusing elements according to various embodiments of the invention. In one embodiment, the field-focusing element includes a single loop coil 50. In another embodiment, the field-focusing element includes multiple turns such as in a split ring structure 52, spiral structure 54, Swiss-roll structure 56, or helical coil 58. Selection of a structure for a particular application is determined by the size and self-resonating frequency of the field-focusing element. For example, in low power applications (less than about 1 Watt, for example), a resonance frequency up to about 1000 MHz is feasible. In high power applications (from about one hundred Watts to about 500 kilowatts, for example), the resonance frequency of the order of several hundred kHz is feasible.

In one embodiment of the power transfer system of the present invention, the resonator of the field-focusing element 18 can be made of dielectric materials in the form of, for example, dielectric cavity resonators. The dielectric materials used in field-focusing element desirably have high dielectric constant (dielectric permittivity, e) and low loss tangent. The high dielectric constant helps in achieving the low frequency of resonance with given smaller dimensions of resonator while the low loss tangent is desirable to keep the dielectric losses within acceptable limits.

In one embodiment, the field-focusing element 18 comprises a self-resonant coil that focuses the magnetic field upon excitation at the resonant frequency. The resonator is self-resonant coil of any shape whose self-resonant frequency depends upon the self-capacitance and self-inductance. The self-resonant frequency of the coil is dependent on the coil geometrical parameters. For example, in the case of helical resonator coil, the resonance frequency is such that the overall length of the helix is half wavelength or multiples of half wavelengths of electromagnetic excitation. As a result, design of these resonators at low frequencies is challenging due to the space constraints. One of the methods to miniaturize the size of resonators is to embed the resonator in a high dielectric constant medium.

In one embodiment, a resonator or an array of resonators of the field-focusing element 18 is embedded in a material having high dielectric constant or a magnetic material having high permeability or magneto-dielectric medium having high dielectric permittivity and high magnetic permeability to achieve lower resonant frequency with a smaller sized resonator. High permeability material enhances self-inductance of the resonator and high permittivity material enhances self-capacitance of the resonators to reduce the frequency of resonance. In another embodiment, high permeability materials are also configured to increase the coupling between the primary coil and the field-focusing element, and between the field-focusing element and the secondary coil.

When the resonator is embedded in dielectric medium the inter-turn capacitance between the turns of the coil increases which in turn helps to reduce the resonant frequency of the resonator. With high dielectric constant, size reduction of the resonator is possible to a great extent. Another advantage of high dielectric constant is the confinement of electric field within the resonator, improving the efficiency of power transfer as the radiation losses are diminished. But one of the design criteria of the selection of material with high dielectric constant is the loss tangent of that material at the operating frequency. The low dielectric loss tangent ensures the maximum coupling efficiency. If the loss tangent is high, the loss in the form of heat may be high in the resonator.

The issue of heat loss is of importance when the power levels are high. For low power levels, high loss tangent values are acceptable. A high dielectric constant and extremely low loss tangent dielectric material are desirable in applications where the power levels are more than one kW. The high dielectric constant helps to achieve miniaturized resonators at frequencies of hundreds of kHz and the low loss tangent helps to reduce the losses in the dielectric.

Power transfer systems enabled through high dielectric constant and low loss tangent materials have applications including electric vehicles charger, power transfer to rotating load, contactless charging of mining vehicles, where the power transfer levels are on the order of a few kW. Power transfer systems having high dielectric constant and high loss dielectric materials can be used in applications like subsea connectors, where the power levels are few milliwatts.

Figure 3:
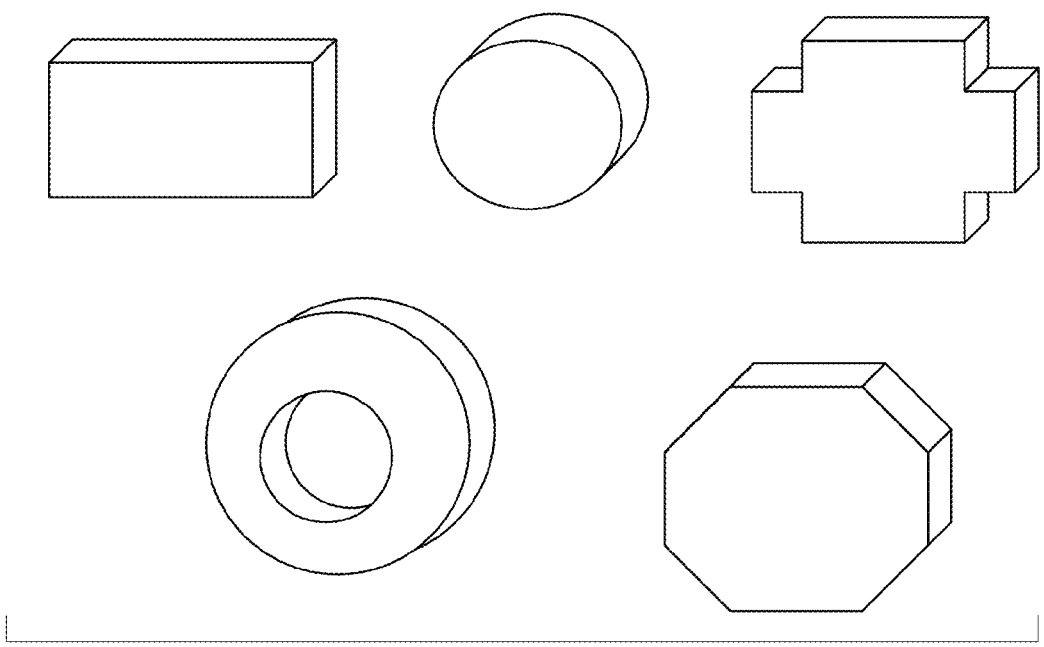
FIG. 3 illustrates multiple exemplary structures of embedding materials according to an embodiment of the invention.

High dielectric constant materials with different shapes can act as embedding material for the resonator. For example, a high dielectric constant circular dielectric disc can act as an embedding material for the resonator at certain frequencies. The resonant frequency in this case is determined by the geometrical configuration of the resonator and embedding material. Non limiting examples of the different shapes that can be used as field-focusing elements are given in FIG. 3.

The high dielectric constant material can also be used as a thin film or thick film coating on a metal surface to create field focusing structures like swiss roll structure 56. The high dielectric constant between the different layers of the swiss roll increases the capacitance of the structure and thereby reducing the frequency considerably.

Embedding resonator material in high dielectric constant materials generally involves some processing of the resonator and embedding materials together. For example, formation of a compact metallic and ceramic layer combination includes many processing challenges. The difference in melting, sintering, or softening points of different metals and ceramics may hinder achievement of the desired properties of the resonator. Thermal expansion difference and differing sintering behaviors may induce cracks or gaps in the compact structure.

The material behavior may change in the presence of other materials. For example, if a metal resonator material and a ceramic dielectric material are to be processed together for the formation of a resonator structure, the processing conditions may have to be designed to retain the metallic behavior of the resonant material without excessive oxidation, while simultaneously processing the ceramic dielectric material to provide the required physical strength to the field focusing element structure. Generally, the ceramic materials are sintered at high temperature to develop the physical strength of the structure. However, sintering the ceramic materials at high temperature may increase particle size of the ceramic material, thereby probably reducing the dielectric property of the ceramic material.

Therefore, it is beneficial to consider resonator materials and high dielectric constant materials that are amenable to process together. Further, a low-temperature processing method is desired to process the resonator materials embedded in the high-dielectric constant dielectric materials.

In one embodiment, a combination of materials can be used for embedding the resonators. For example, a mixture of two or more materials having high dielectric constant or two or more materials having high permeability can be used as the embedding material. In another embodiment, a mixture of two or more materials, each having a high dielectric constant or a high permeability can be used as the embedding material. In one embodiment, a dielectric material includes an oxide material that has beneficial dielectric properties and a secondary oxide material that aids in the sintering behavior of the oxide material.

The inventors found that the density of materials plays an important role in the dielectric properties of the materials. Obtaining a dense dielectric material without subjecting the material to very high temperature of sintering helps in increasing the dielectric properties of the oxide material. If the microstructure of the dielectric materials is dense, the materials comprise fewer air pores in the material body. Air normally has a lower dielectric constant than the dielectric materials and hence is expected to lead to an overall lower dielectric constant, when present in the material.

For a ceramic oxide material, another oxide material with low-melting point may be used as an aid for densification. Non limiting examples of secondary oxide material that can be used as a densification aid for the ceramic oxide compound include copper oxide (CuO), vanadium pentoxide ($V_2O_5$), lithium oxide ($Li_2O_3$), and bismuth oxide ($Bi_2O_3$).

In one embodiment of the power transfer system, the dielectric materials exist in the bulk material form and are polycrystalline, with grains and grain boundaries. Increased grain boundary conduction in the oxide material system may improve dielectric properties.

In one embodiment of the power transfer system, any of the materials described above included in the field-focusing element is doped with a bismuth-containing material, such as bismuth oxide. In a further embodiment, bismuth exists in a metallic phase in the grain boundaries of the polycrystalline materials used for field-focusing element. In a related embodiment, bismuth oxide is doped and reduced to become metallic bismuth in the grain boundaries of the dielectric material. In one embodiment, the bismuth oxide is introduced to the grain boundaries by mixing $Bi_2O_3$ and $TiO_2$ with the calcined oxide materials before forming the dielectric materials into the bulk form incorporable to the field-focusing element 18 and sintering. In one embodiment, less than about 3 mole % of $Bi_2O_3.3TiO_2$ is present in the dielectric material. In one embodiment, the $Bi_2O_3.3TiO_2$ is present in the dielectric material in a range from about 0.01 mole % to about 1 mole %. In one embodiment, the oxide material has a metallic bismuth phase in the grain boundaries. It is found that the dielectric constant of the oxide material increases significantly by having a metallic bismuth phase in the grain boundaries.

Materials such as, but not limited to, titanium oxide ($TiO_2$) and various titanate compounds are examples of materials exhibiting low loss tangent values. In one embodiment, the dielectric material is used as a bulk material. The term "bulk material" as used herein indicates any material that has a three dimensional structure with all of the sides greater than about 1 mm. In one embodiment, the dielectric materials are used as coatings. The coating can be in a thin film form or in a thick film form. As used herein a "thin film" has a thickness less than about 100 microns, while a thick film can have thickness from about a hundred microns to about a millimeter.

In one embodiment, it is desirable to use dielectric materials whose dielectric properties such as dielectric constant and loss tangent are substantially stable over a certain frequency range of the desired applications. The term "substantially stable" herein means that the change in values does not lead to more than about 10% of the performance variation of the power transfer system. Thus, the required value and width of the frequency ranges may vary depending on the applications for which the field-focusing element is used. In one embodiment, the desired frequency range is from about 100 Hz to about 100 MHz. In some embodiments, the desired frequency range is from about 1 kHz to about 100 kHz. In another embodiment, the desired frequency range is from about 100 kHz to about 1 MHz. In one more embodiment, the desired frequency range is from about 1 MHZ to about 5 MHz.

Materials having a low dielectric loss tangent along with high dielectric constant may function efficiently in enhancing the self-capacitance of the resonators when used as the embedding materials or cavity resonators, compared to materials that have low dielectric constant and high loss tangent. Therefore, materials that have both high dielectric constant and low dielectric loss tangent at the frequency of operation of the resonators are desirable to be used in the field-focusing element 18.

A dielectric material to be used in a field-focusing element 18 of the power transfer system would desirably have a high dielectric constant that is equal to or greater than about 10 and a loss tangent that is as low as possible. In one embodiment, a loss tangent equal to or less than about 0.1 may be acceptable for a dielectric material to be used in field-focusing element. In a subsequent embodiment, a loss tangent equal to or less than about 0.01 is desirable for the dielectric material.

In one embodiment, a material system with the formula $(Mg_{1-x}Sr_x)_y TiO_{(2+y)}$, wherein $0 \leq x \leq 1$, and y=0, 1, or 2, is provided for use in, for example, the field-focusing element 18 of the power transfer system described above. This material system will be henceforward referred to as "the oxide material" for simplicity. As used herein, the term 'greater than zero' denotes that the intended component is intentionally added, rather than an incidental amount that may be present as an impurity. As used herein, end points of the ranges include incidental variations above and below the stated number, as appropriate for normal measurement and process variations. In one embodiment, a power transfer system is presented comprising oxide material as a dielectric material.

As used herein the notation $(Mg_{1-x}Sr_x)_y TiO_{(2+y)}$ is a theoretical formula including the mixtures and compounds that are in the specified ratio to be denoted by this formula, and does not necessarily mean that a single compound exists in a form that can be identified by standard characterization techniques. In short, a material specified by the above formula may actually exist as multiple phases which, taken collectively, have an overall composition as specified by the formula.

In the oxide material of the dielectric material, the titanium, magnesium and strontium levels were varied and studied for their effects on favorable dielectric properties. Thus, in one embodiment, a power transfer dielectric material is provided such that x, y=0. Therefore, in this embodiment, the dielectric material comprises titanium oxide. In one embodiment, the dielectric material is the $TiO_2$ system, while in other embodiments, the dielectric material may comprise other dielectric compounds or other additional materials that increase the dielectric properties or assist in the processing of the dielectric material. For example, $TiO_2$ with about 1 wt % CuO increases the dielectric constant of the material at a lower frequency compared to the pure $TiO_2$, without compromising on the loss tangent value. $TiO_2$ with about 1 mole % $Bi_2O_3 \cdot 3TiO_2$ increases the dielectric constant and significantly decreases the loss tangent value. In one embodiment, $TiO_2$ is combined with a secondary oxide material $2MgO \cdot SiO_2$. In a further embodiment, the dielectric material comprises up to about 70% by weight of the $2MgO \cdot SiO_2$ material along with $TiO_2$.

Table 1 provides the experimental processing details and results of the $TiO_2$ based dielectric materials. In the table, the column "Material" denotes the different combinations of the ceramic materials; "conditions" are the processing conditions of ceramic materials that are used for the current experiment. RT represents "room temperature". The dielectric constant (DC) and dielectric loss tangent (DLT) measured at particular frequency denoted at the column "At frequency" are presented. The column "frequency range" presents the approximate frequency range where the ceramic materials are particularly advantageous to be used in a field-focusing element.

TABLE 1

| Material | Conditions | At Frequency | DC | DLT | Frequency range |
|---|---|---|---|---|---|
| $TiO_2$ | 1000° C./ 2 h | 1.32 MHz | 40 | $4.00^{e-04}$ | 1-2 MHz |
| $TiO_2$ + 2 wt % CuO | 1000° C./ 2 h | 183 KHz | 80 | $4.00^{e-04}$ | 140-250 KHz |
| $TiO_2$ + 1 mol % $Bi_2O_3 \cdot 3TiO_2$ | 1050° C./ 6 h | 1 MHz | 258 | $5.00^{e-05}$ | |

TABLE 1-continued

| Material | Conditions | At Frequency | DC | DLT | Frequency range |
|---|---|---|---|---|---|
| $2MgO \cdot SiO_2$ + 30 wt % $TiO_2$ | 1400° C./ 3 h | 879 KHz | 18 | $1.00^{e-03}$ | 820-900 KHz |

In one embodiment, an oxide material of the dielectric material is provided such that x=0 and y=1. Therefore, in this embodiment, the dielectric material comprises magnesium titanate ($MgTiO_3$). In one embodiment, the dielectric material is the $MgTiO_3$ system. In an example, the $MgTiO_3$ material prepared by sintering at about 1400° C. temperature for 3 hours exhibited a dielectric constant of about 15 and dielectric loss tangent less than about 0.01, when operated at the frequency range of about 230-400 kHz. At the frequency of about 293 kHz, the $MgTiO_3$ exhibits a dielectric constant of about 15 and the loss tangent value of about $2.00\ e^{-04}$.

In some embodiments, the dielectric material may comprise other dielectric compounds or other additional materials that increase the dielectric properties or assist in the processing of the dielectric material. For example, certain materials added with $MgTiO_3$ may increase the dielectric properties of the $MgTiO_3$ system. CuO, $Bi_2O_3 \cdot 3TiO_2$, Vanadium pentoxide ($V_2O_5$) etc. are some of the examples of additional materials that may be combined with $MgTiO_3$ for potential improvement of the dielectric properties.

In one embodiment, an oxide material of the dielectric material is provided such that x=1 and y=1. Therefore, in this embodiment, the dielectric material comprises strontium titanate ($SrTiO_3$). In one embodiment, the dielectric material is the $SrTiO_3$ system. In an example, the $SrTiO_3$ material prepared by sintering at about 1350° C. temperature for about 6 hours exhibited a dielectric constant of about 50 and dielectric loss tangent less than about 0.001, when operated at the frequency range of about 7-9.5 MHz. At a frequency of about 7.5 MHz, the $SrTiO_3$ exhibits a dielectric constant of about 46 and a loss tangent value of about $3.00\ e^{-06}$.

In one embodiment, $0<x<1$ and y=1, forming a titanate system with magnesium strontium titanate ($Mg_x Sr_{(1-x)} TiO_3$). In another embodiment, $0 \leq x \leq 1$ and y=2 forming a titanate system with magnesium strontium titanate $(Mg_x Sr_{(1-x)})_2 TiO_4$.

The examples presented above depict different oxide materials included in the dielectric materials that can be used in the field-focusing element 18 presented above. The different material systems presented herein were found to be beneficial at some frequency ranges, collectively covering a wide frequency range from about 230 kHz to about 10 MHz. While some particular examples are presented herein, the variations in the dopant combinations, levels, resultant properties and working frequency ranges will be appreciated by one skilled in the art.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power transfer system comprising:
   a first coil coupled to a power source;
   a second coil coupled to a load; and
   a field-focusing element disposed between the first coil and the second coil and comprising a dielectric material and two open ends, wherein the dielectric material comprises an oxide material comprising $(Mg_{1-x}Sr_x)_y TiO_{(2+y)}$, and y=0, 1, or 2, and wherein the field-focusing element is configured to develop a standing wave current distribution and focus a magnetic field onto the second coil, wherein the field-focusing element comprises multiple sets of resonators, each set of resonators configured to be excited to a different phase to facilitate focusing the magnetic field in a desired direction.

2. The power transfer system of claim 1, wherein the field-focusing element comprises a plurality of resonators arranged in an array, wherein the sets of resonators are configured to enhance the magnetic field in the direction of the second coil.

3. The power transfer system of claim 1, wherein the field-focusing element comprises a single loop.

4. The power transfer system of claim 1, wherein the field-focusing element comprises a spiral structure.

5. The power transfer system of claim 1, wherein the field-focusing element comprises a dielectric cavity resonator.

6. The power transfer system of claim 1, wherein the field focusing element is closer to the first coil than the second coil.

7. The power transfer system of claim 1, wherein the field focusing element comprises a film coating on a metallic surface.

8. The power transfer system of claim 2, wherein a resonator of the plurality of resonators is embedded in the dielectric material.

* * * * *